United States Patent
Peiffer et al.

(10) Patent No.: US 7,055,028 B2
(45) Date of Patent: May 30, 2006

(54) HTTP MULTIPLEXOR/DEMULTIPLEXOR SYSTEM FOR USE IN SECURE TRANSACTIONS

(75) Inventors: Christopher Peiffer, Menlo Park, CA (US); Israel L'Heureux, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 178 days.

(21) Appl. No.: 10/136,030

(22) Filed: Apr. 29, 2002

(65) Prior Publication Data

US 2003/0033520 A1    Feb. 13, 2003

Related U.S. Application Data

(63) Continuation-in-part of application No. 09/975,522, filed on Oct. 10, 2001, which is a continuation-in-part of application No. 09/882,375, filed on Jun. 15, 2001, now abandoned.

(60) Provisional application No. 60/239,552, filed on Oct. 10, 2001, provisional application No. 60/287,188, filed on Apr. 27, 2001, provisional application No. 60/308,234, filed on Jul. 26, 2001.

(51) Int. Cl.
*H04L 9/00* (2006.01)

(52) U.S. Cl. ............... 713/151; 713/153; 713/164; 370/230; 709/238; 709/275; 709/105; 709/218; 709/230; 726/3; 726/30

(58) Field of Classification Search ............... 713/151, 713/153, 164, 200, 201; 370/230; 709/238, 709/275, 218, 230, 105; 726/3, 30

See application file for complete search history.

(56) References Cited

U.S. PATENT DOCUMENTS

| | | | |
|---|---|---|---|
| 4,698,801 A | 10/1987 | Hatano et al. | |
| 4,903,823 A | 2/1990 | Plesser et al. | |
| 5,329,619 A | 7/1994 | Page et al. | |
| 5,644,718 A | 7/1997 | Belove et al. | |
| 5,678,007 A | 10/1997 | Hurvig | |
| 5,826,261 A | 10/1998 | Spencer | |
| 5,941,988 A | 8/1999 | Bhagwat et al. | |
| 6,070,191 A | 5/2000 | Narendran et al. | |
| 6,098,108 A | 8/2000 | Sridhar et al. | |
| 6,104,716 A | 8/2000 | Crichton et al. | |
| 6,138,162 A | 10/2000 | Pistriotto et al. | |
| 6,243,379 B1 | 6/2001 | Veerina et al. | |
| 6,252,848 B1 | 6/2001 | Skirmont | |
| 6,266,707 B1 | 7/2001 | Boden et al. | |

(Continued)

OTHER PUBLICATIONS

International Search Report, PCT/US01/31854, issued Jan. 31, 2002.

(Continued)

*Primary Examiner*—Emmanuel L. Moise
*Assistant Examiner*—Paul Callahan
(74) *Attorney, Agent, or Firm*—Shumaker & Sieffert, PA

(57) ABSTRACT

A computer networking system, method and device are provided for use in secure networking transactions. The method may include pre-establishing a secure server-side connection between the secure networking device and a server. The method may also include receiving requests at the secure networking device from the plurality of clients via plural client-side connections between the networking device and each of the clients. The method may further include sending the requests from the plurality of clients over the pre-established secure server-side connection. SSL may be used to provide security for the server-side and/or client-side connections.

49 Claims, 8 Drawing Sheets

U.S. PATENT DOCUMENTS

| | | |
|---|---|---|
| 6,324,582 B1 | 11/2001 | Sridhar et al. |
| 6,363,077 B1 | 3/2002 | Wong et al. |
| 6,411,986 B1 | 6/2002 | Susai et al. |
| 6,581,090 B1 | 6/2003 | Lindbo et al. |
| 6,614,758 B1 | 9/2003 | Wong et al. |
| 6,754,621 B1 * | 6/2004 | Cunningham et al. ...... 704/219 |
| 6,779,017 B1 | 8/2004 | Lamberton et al. |
| 6,779,039 B1 | 8/2004 | Bommareddy et al. |
| 6,882,623 B1 | 4/2005 | Goren et al. |
| 6,920,157 B1 | 7/2005 | Park |
| 2002/0059428 A1 | 5/2002 | Susai et al. |
| 2004/0037278 A1 | 2/2004 | Wong et al. |

OTHER PUBLICATIONS

Copy of International Preliminary Examination Report, PCT Application No. PCT/US01/31854, mailed Feb. 5, 2003, 4 pgs.

Copy of International Search Report, PCT Application No. PCT/US03/09767, mailed Jun. 9, 2003, 4 pgs.

Fielding et al., "Hypertext Transfer Protocol - HTTP/1.1," RFC 2616, Jun. 1999, 7 pp.

* cited by examiner

HTTP MULTIPLEXOR/DEMULTIPLEXOR SYSTEM FOR USE IN SECURE TRANSACTIONS

CROSS-REFERENCE TO RELATED APPLICATIONS

This application is a continuation-in-part of U.S. patent application Ser. No. 09/975,522, entitled "HTTP Multiplexor/Demultiplexor," filed on Oct. 10, 2001, which in turn is a continuation-in-part of U.S. patent application Ser. No. 09/882,375, entitled "HTTP Multiplexor/Demultiplexor," filed on Jun. 15, 2001 now abandoned, which in turn claims priority from U.S. Provisional Patent Application Ser. No. 60/239,552, entitled "HTTP Multiplexor/Demultiplexor," filed on Oct. 10, 2000. This application also claims priority to U.S. Provisional Patent Application Ser. No. 60/287,188, entitled "Data Transfer System and Method," filed on Apr. 27, 2001, and to U.S. Provisional Patent Application Ser. No. 60/308,234 entitled "Computer Networking Device," filed on Jul. 26, 2001. The disclosures of all of these applications are incorporated herein by reference, in their entirety and for all purposes.

TECHNICAL FIELD

The present invention relates generally to data transmission on computer networks, and more particularly to a networking device including a Hypertext Transfer Protocol (HTTP) Multiplexor/Demultiplexor configured for use in secured transactions.

BACKGROUND OF THE INVENTION

The Internet has experienced explosive growth in recent years. The emergence of the World Wide Web has enabled millions of users around the world to easily download web resources containing text, graphics, video, and sound data while at home, work, or from remote locations via wireless devices. These web resources often are large in size and therefore require a long time to download, causing the user delay and frustration. Delay often causes users to abandon the requested web page and move on to another web page, resulting in lost revenue and exposure for many commercial web sites.

One cause of delay is accumulation of Hypertext Transfer Protocol (HTTP) requests within a Transfer Control Protocol (TCP) buffer of a server socket. When a user requests a web page, a web browser sends HTTP requests to a server socket via an established TCP connection. When the server does not process requests to a socket quickly enough, HTTP requests build up in the TCP buffer for that socket, resulting in processing delay in that socket.

An additional cause of delay is socket-related overhead processing. Conventional networking systems open up a server socket for each client that connects to the server, so that server overhead tends to increase in proportion to the number of connected clients. A given server can efficiently handle only so much overhead at once. Accordingly, the one-socket-per-client approach fundamentally limits the number clients that can simultaneously access a server.

These problems are magnified for secure transactions, such as transactions using the Secure Socket Layer (SSL) protocol, due to key exchanges and other security-related overhead processing. Under high loads, server response times drastically slow down, and clients often "time out" pending requests, and tear down and attempt to reestablish the connection. For each connection that is reestablished, a new key exchange must take place, and a new "slow start" procedure must be followed, in which TCP requests are initially sent at a slower rate to avoid network congestion. The constant tearing down and reestablishment of connections prevents the SSL traffic from receiving the time-saving benefits of so-called "persistent connections" enabled in HTTP 1.1, over which requests and replies may be "pipelined" in a non-serial manner. This further places additional burden on the SSL server. The result is that connections using the SSL protocol tend to be much slower than non-SSL connections.

One prior approach to the problem of slow SSL connections is SSL session ID caching and reuse. According to this approach, the server caches a SSL session ID for each SSL session. The session ID is shared with the client, and is valid for a predetermined period of time, such as 10 minutes. If the SSL connection between the server and client times out or is otherwise terminated, the client can reconnect to the server and announce its SSL session ID. The server is configured to check the announced session ID against a cache of stored session IDs, and, if a valid match is detected, reestablish the SSL connection without a new key exchange, thereby saving time. Under heavy loads, however, SSL session ID caching and reuse has the drawback that the server must manage a large cache of SSL session IDs, which significantly slows down server performance.

Further contributing to slow SSL connections, the security policies of many financial institutions require that all internal web-based transmission of financial information be conducted over secure connections. Thus, when a user accesses a bank web site, secure connections are required not only for the connection from the user to the bank, but also for all internal connections carrying the financial information between servers within the bank. The problems described above occur for each of multiple SSL connections involved in processing the user's request, further slowing response overall times. To combat these slow response times, financial institutions have been forced to deploy a higher number of servers than non-secure entities to service the same number of client connections. This results in higher costs for the financial institutions, which are ultimately passed on to consumers.

SUMMARY OF THE INVENTION

A system, method and device for multiplexing and demultiplexing HTTP requests and responses are provided. The method may include receiving HTTP requests from a plurality of clients and routing those requests to a single socket on a server system. The HTTP requests may be routed to a particular server socket based on socket response time, the type or size of data being requested, and/or on other parameters related to the HTTP requests. The method may also include receiving HTTP responses from the server system, and selectively routing those responses to corresponding clients.

According to another aspect of the invention, the method typically includes at an intermediate networking device, receiving HTTP requests from multiple originating clients, multiplexing the HTTP requests, and sending the multiplexed HTTP requests to an optimal server socket. The method may further include receiving the HTTP responses from the server system, demultiplexing the HTTP responses, and sending the demultiplexed HTTP responses to corresponding originating clients.

The system typically includes a server system, plural clients configured to connect to the server system via a computer network, and a computer networking device positioned intermediate the server system and the clients on the computer network. The computer networking device typically has an HTTP multiplexor/demultiplexor configured to receive HTTP requests from more than one of the clients and to distribute those requests as a multiplexed transmission to a socket on the server system via a TCP connection.

The device typically includes an HTTP multiplexor/demultiplexor configured to receive HTTP requests from a plurality of clients and to distribute those requests in multiplexed form to a server system via a TCP connection. The device typically is further configured to receive HTTP responses from the server system, demultiplex the responses, and route the demultiplexed responses to corresponding clients.

According to another aspect of the invention, a secure networking device is provided, including an HTTP multiplexor/demultiplexor configured to receive HTTP requests from the plurality of clients via a plurality of client-side connections, and to route the requests from the plurality of clients to a target server over a common, secure, server-side connection to the server. The HTTP multiplexor/demultiplexor may be further configured to receive a plurality of responses to the HTTP requests from the target server, via the common, secure, server-side connection, and to route each of the plurality of responses back to an originating client.

According to another aspect of the invention, a secure networking system, is provided, including a plurality of clients configured to initiate HTTP requests and a front-end server configured to serve HTTP responses in response to receiving HTTP requests from each of the clients. The system may further include a secure networking device configured to pre-establish a secure connection to the front-end server, and to connect to the plurality of clients via a plurality of secure client-side connections, wherein the secure networking device is further configured to receive a plurality of HTTP requests from the plurality of clients via the plurality of secure client-side connections, and to route the requests from the plurality of clients to the front-end server over the secure front-end server-side connection.

According to another aspect of the invention, a secure networking method is provided, including the steps of pre-establishing a secure server-side connection between the secure networking device and a server, receiving requests at the secure networking device from the plurality of clients via plural client-side connections between the networking device and each of the clients, and sending the requests from the plurality of clients over the pre-established secure server-side connection.

According to another aspect of the invention, a computer networking device is provided, including a Secure Socket Layer (SSL) multiplexor/demultiplexor configured to receive SSL-encapsulated HTTP requests from a plurality of the clients and to distribute those requests over an individual server TCP connection to a corresponding socket on the server system.

DETAILED DESCRIPTION OF THE INVENTION

Figure 1:
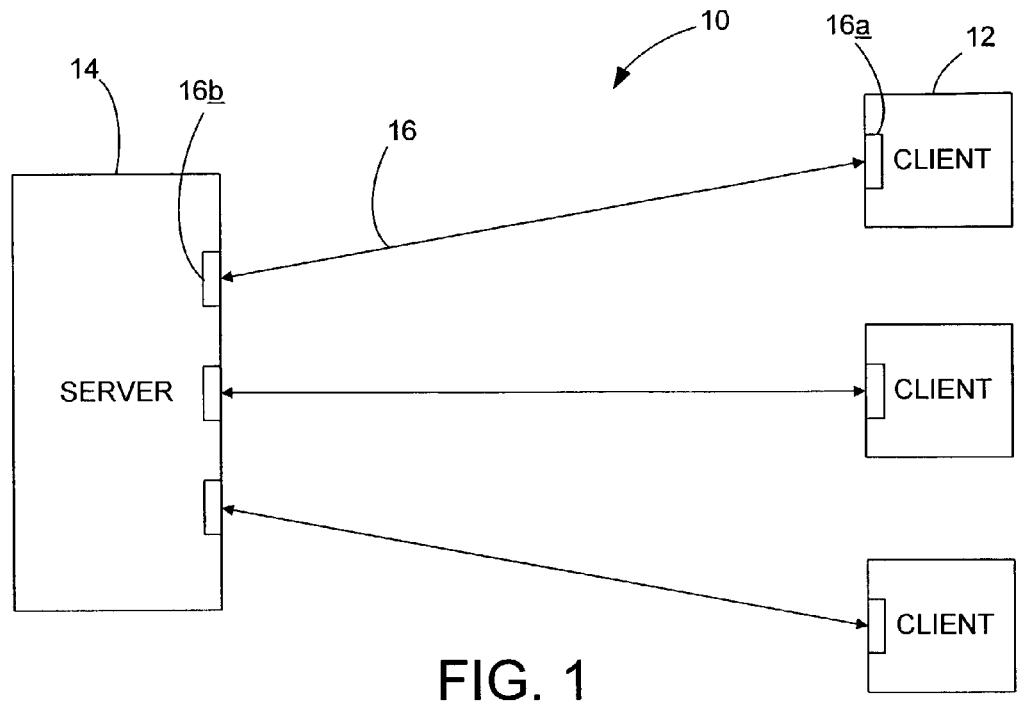
FIG. 1 is a schematic view of a prior art network configuration.

Referring initially to FIG. 1, a prior art networking system is shown generally at 10. System 10 includes a plurality of remote clients 12 and a server 14. In system 10, a single Transport Control Protocol (TCP) connection 16 is established between each remote client 12 and server 14. Each TCP connection 16 is established between a single socket 16a on each remote client and a corresponding socket 16b on server 14, such that a one-to-one socket ratio is established. In other words, one server socket is opened for each connected client. Remote clients 12 send Hypertext Transfer Protocol (HTTP) requests via established TCP connections to a TCP buffer associated with server socket 16b. Requests received at the TCP buffer are processed only as quickly as the server can respond to them. Often, requests build up in the buffer because the server cannot respond to them quickly enough, and server-side delay (also referred to as latency) often results. This is inefficient and frustrating, and may cause a user to abandon downloading the page.

In addition, each server socket 16b opened requires a certain amount of overhead processing by the server. This overhead processing tends to increase in proportion to the number of sockets that are opened, and thus in proportion to the number of clients connecting to the system. To maintain acceptable response times, the server system must limit the number of client computers that may be connected at any given time, typically by periodically timing out established client connections.

Figure 2:
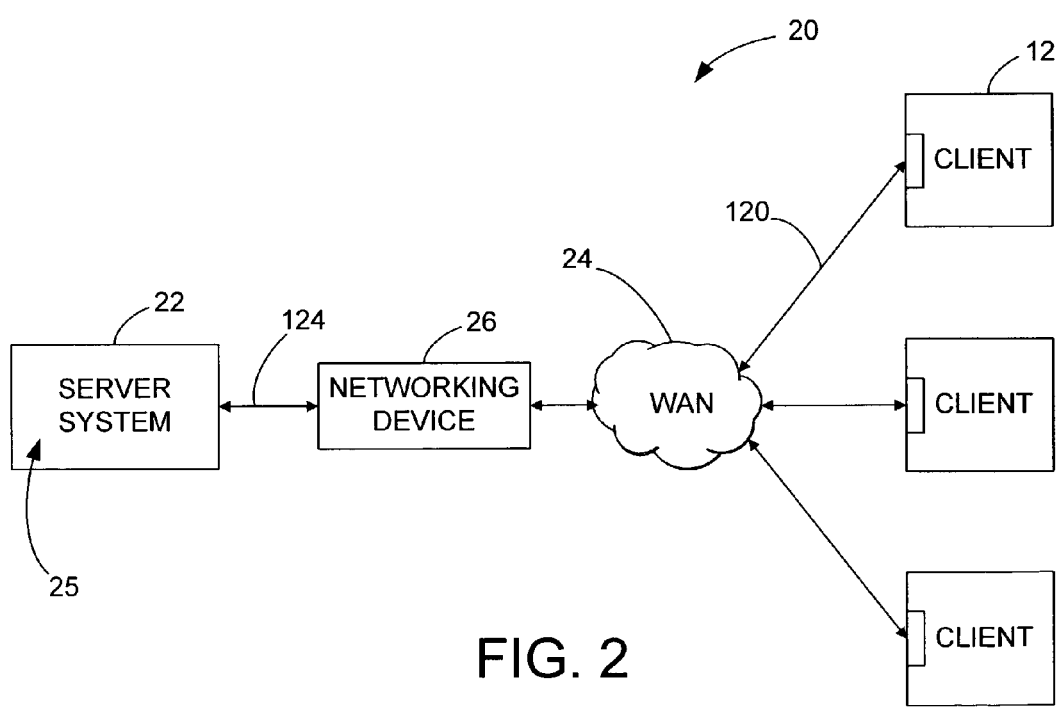
FIG. 2 is a schematic view of a networking device and system according to the present invention, including an HTTP multiplexor/demultiplexor.
Figure 3:
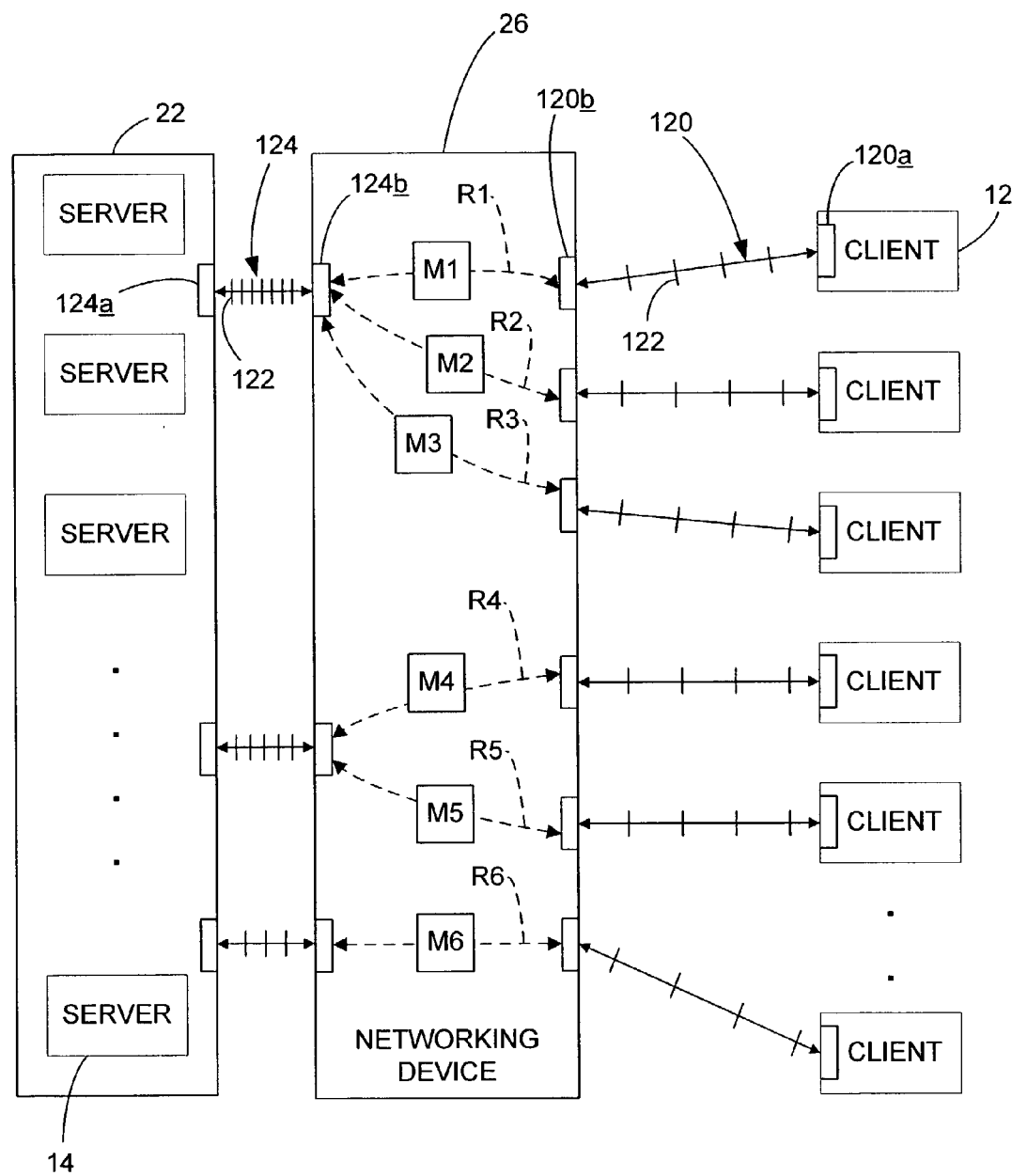
FIG. 3 is a schematic view of the networking device and system of FIG. 2, showing routing, multiplexing and demultiplexing features that the device and system may be configured to perform.

In FIG. 2, a system for processing HTTP requests according to one embodiment of the present invention is shown generally at 20. System 20 typically includes a plurality of remote clients 12 configured to connect with server system 22 via computer network 24 and networking device 26. As seen in FIG. 3, server system 22 may include one or more servers 14, including web servers, applications servers and the like. In a typically employed configuration, server system will host and provide access to a website 25. As will be explained in detail with reference to FIG. 3, connection between clients 12 and server system 22 is established via client TCP connections 120 on the "client side" of networking device 26 and server TCP connections 124 on the "server side" of the networking device. Networking device 26 may include an HTTP multiplexor/demultiplexor, as explained in more detail below, which is configured to route HTTP requests/responses and other network traffic between clients 12 and server system 22. This routing function may be configured to provide for combining or multiplexing traffic received from multiple client connections onto a single connection to the server system. In these implementations, the system typically is also configured to separate, or demultiplex the traffic received along that single server connection, for selective routing and delivery to the appropriate connected clients.

Multiplexing and demultiplexing reduces the amount of server sockets necessary to service a given number of connected clients. The resulting reduction in socket-related overhead processing improves system performance and/or frees resources to allow more clients to connect to the system. In addition, where multiple server sockets are available, the system may be configured to further optimize performance through performance-based selection of server sockets. For example, HTTP requests may be selectively routed to a particular server socket based on optimal response time, in order to ensure efficient processing of the requests. It should be appreciated that the term socket, as used in connection with the present invention, refers to a port, buffer, logical node, or object configured to receive data in HTTP and other formats from a remote device via a network connection, and is not limited to a "socket" as defined in the Unix operating system environment.

Figure 4:
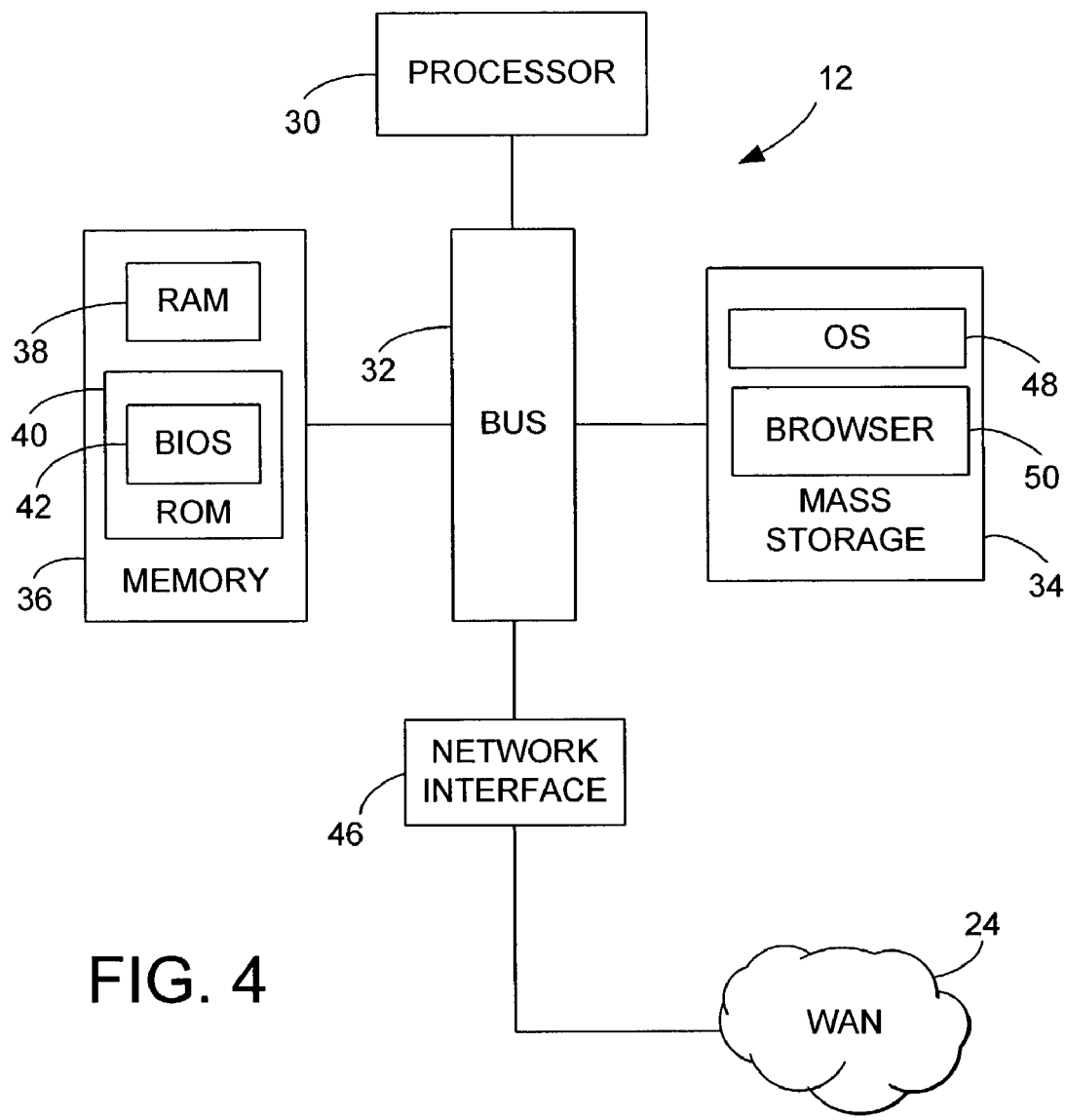
FIG. 4 is a schematic view of a client computing device that may be used with the device and system of FIG. 2.

Referring now to FIG. 4, remote client 12 typically is a personal computer including a processor 30 coupled to a communications bus 32. A mass storage device 34, such as a hard drive, CD ROM drive, tape drive, etc., and a memory 36 are also linked to the communications bus 32. Memory 36 typically includes random access memory (RAM) 38, and read-only memory (ROM) 40. ROM 40 typically includes a basic input/output system (BIOS) 42, which is configured to start up and operate basic functions of the remote client. Remote client 12 typically is configured to access computer network 24 via a network interface 46. Alternatively, remote client 12 may be a portable data assistant, web-enabled wireless device, mainframe computer, or other suitable computing device.

Remote client 12 typically is configured to run an operating system (OS) 48 to manage programs or applications. Operating system 48 is stored in mass storage device 34. Examples of suitable operating systems include UNIX, Windows, MacOS, VMS, and OS/2, although virtually any suitable operating system may be used. Remote client 12 includes a browser program 50 stored in mass storage device 34 configured to display requested web resources to a user of remote client 12. Exemplary browser programs 50 include the Netscape browser commercially available from Netscape Communications Corporation of Santa Clara, Calif. and the Internet Explorer browser commercially available from Microsoft Corporation of Redmond, Wash.

Server 14 also typically is a computer similar to that shown in FIG. 4. Server 14 typically includes a server program configured to communicate with remote clients using the HTTP protocol. The server program typically is configured to receive HTTP requests, and, in response send HTTP responses to browser 50 on remote client 12 via computer network 24.

Figure 5:
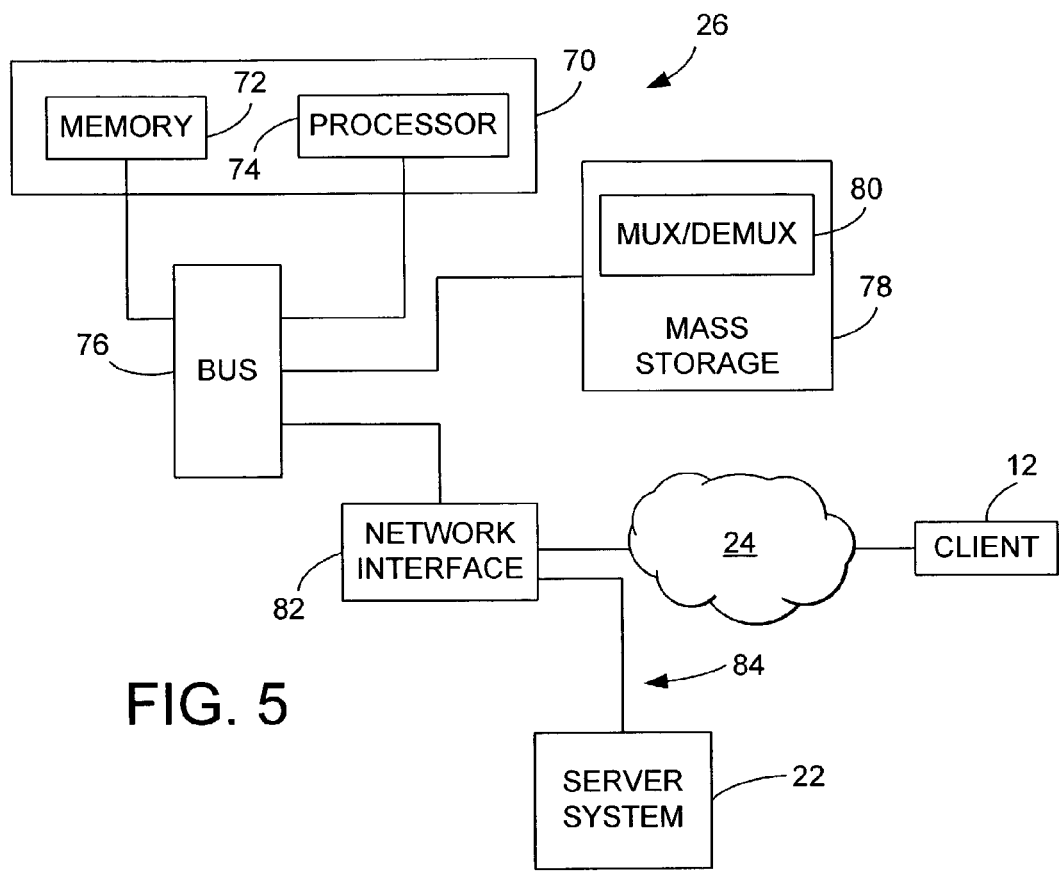
FIG. 5 is a schematic view of one embodiment of the networking device of FIG. 2.
Figure 6:
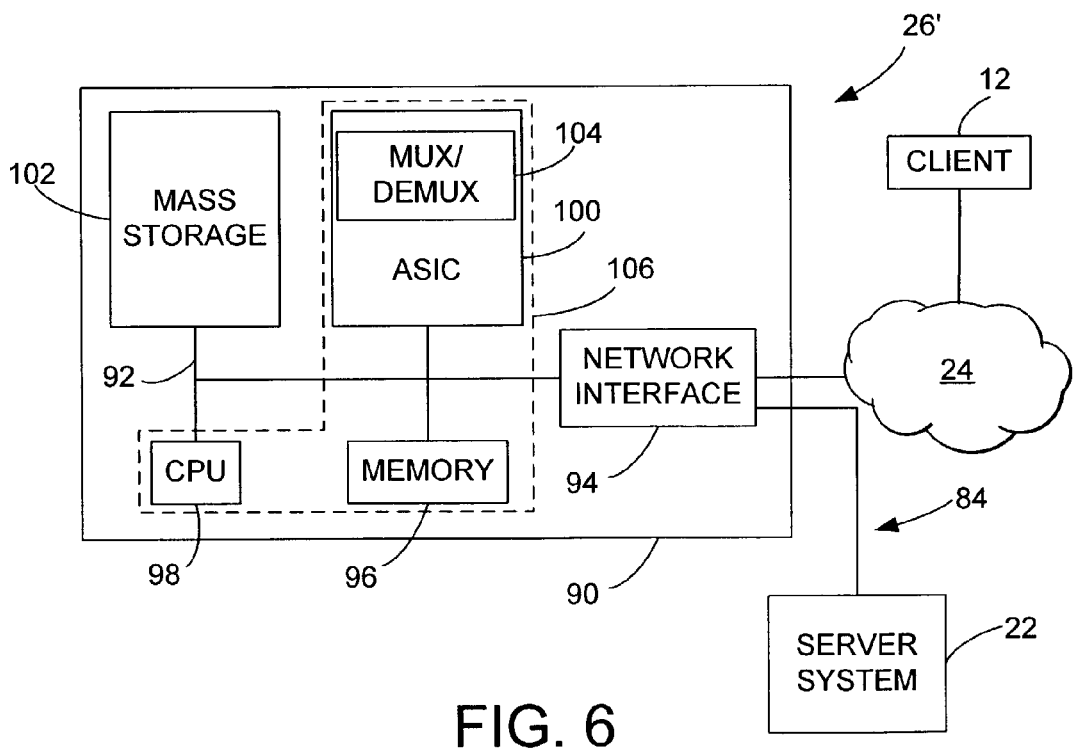
FIG. 6 is a schematic view of another embodiment of the networking device of FIG. 2.

Networking device 26 may be connected to server system 22 and remote clients 12 in various ways. On the client side, device 26 typically is connected to remote clients 12 via a public-type network, such as wide area network (WAN) 24, as seen in FIGS. 5 and 6, which may form part of the Internet. The server-side link between device 26 and server system 22 typically is a private network such as an intranet or local area network (LAN) 84.

Web site 25 typically includes a collection of web resources typically located at a web address called a URL (Uniform Resource Locator), or at another form of URI (Uniform Resource Identifier). The term "web resource" refers generally to a data resource that may be downloaded or accessed by a web browser. Web resources may include web pages, executable code, scripts, graphics, video, sounds, text, and/or other data. Web resources may be static (e.g. stored file) or dynamic (e.g. dynamically generated output). Web resources may be stored on and served by a single server 14 or a number of servers 14. For example, images may be stored on one server while code may be stored in another server, and alternatively, copies of images and code may be stored on multiple redundant servers.

As shown in FIG. 5, networking device 26 typically includes a controller 70 having a memory 72 and processor 74 linked by a bus 76. Also coupled to bus 76 is a mass storage device 78 including a multiplexor/demultiplexor 80, which may also be referred to as a "mux/demux." Networking device 26 also typically includes a network interface 82 coupled to bus 76. Network interface 82 is configured to enable networking device 26 to communicate with client 12 via WAN 24 and with server system 22 via LAN 84. An example of a suitable network interface is the Intel Ethernet Pro 100 network card, commercially available from Intel Corporation of Santa Clara, Calif.

In FIG. 6, another embodiment of a networking device according to the present invention is shown generally at 26'. Networking device 26' typically includes an integrated circuit board 90. The integrated circuit board contains a bus 92 connecting a network interface 94, memory 96, processor 98, Application Specific Integrated Circuit (ASIC) 100, and mass storage device 102. Network interface 94 is configured to enable networking device 26' to communicate with remote client 12 via WAN 24 and with server system 22 via LAN 84. ASIC 100 typically contains a multiplexor/demultiplexor 104. ASIC 100, processor 98, and memory 96 form a controller 106 configured to process requests for web resources according to the methods described below. It will be appreciated that the embodiments of networking device 26, 26' may be a stand-alone network appliance or may be integrated with a web server. Additionally, the mass storage device of networking device 26, 26' is typically Flash memory, ROM, or other form of non-volatile memory, although it will be appreciated that a hard drive or other drive may also be used.

As indicated above, networking device 26 typically is connected to server system 22 via LAN 84. Because the server-side connection is a private-type connection, while the client connections are public-type connections (e.g., WAN 24), networking device 26 may be considered a server-side proxy server. A proxy server is a program or device that acts as an intermediary between a browser and a server. Networking device 26 acts as an intermediary by receiving HTTP requests from remote clients 12 and sending those requests to a socket on server system 22, and by receiving server-generated HTTP responses and sending those responses to the remote client that originated the requests.

The networking devices of the present invention typically are provided with a software or firmware multiplexor/demultiplexor configured to route network traffic between remote clients and a server system. Typically, this is done by multiplexing HTTP requests received at network device 26 via multiple client TCP connections 120, so that those requests may be forwarded from device 26 as a multiplexed transmission to server system 22. This multiplexed transmission normally occurs via a single server TCP connection 124, so that only one socket is opened on the server side. Server system 22 in turn generates HTTP responses corresponding to the various requests of the remote clients 12. These responses are provided along a single server TCP connection 124 to device 26, where they are demultiplexed so that they may be selectively routed and delivered to the appropriate originating client 12.

The above description contemplates routing of all traffic from multiple client TCP connections onto a single server-side TCP connection. Alternatively, as will be seen with reference to FIG. 3, requests and responses may be routed to and from more than one server socket. It is preferable, however, that the number of server sockets used be fewer than the number of client connections, in order to reduce the per-socket overhead occurring on the server side of the system. As indicated above, overhead processing can significantly affect overall performance. One of the advantages of the present system is a reduction of socket-related server overhead, which permits individual servers to handle more client connections.

Referring now to FIG. 3, each remote client 12 has an associated client TCP connection 120 established with networking device 26, typically via a telecommunications network such as WAN 24 (FIG. 2). Each client connection 120 includes a client socket 120a associated with one of client computers 12 and a client-side device socket 120b (or, simply client-side socket 120b) associated with networking device 26. Remote clients 12 are typically configured to send HTTP requests/responses 122 via connections 120.

Server system 22 is coupled with networking device 26 via various server TCP connections 124. Similar to the client side, each server connection 124 includes a server-side device socket 124b (or, simply server-side socket 124b) associated with networking device 26 and a server socket 124a associated with server system 22. As indicated, server system 22 may include a plurality of servers 14 configured to perform various functions. Server connections 124 and their associated sockets may be in a one-to-one relationship with servers 14, or multiple connections 124 may be associated with a given individual server.

The previously described multiplexing, demultiplexing and routing capabilities are more clearly seen with reference to FIG. 3. For, example, with respect to the top three client computers on the right side of the figure, the figure depicts combining (e.g., by multiplexing) the traffic associated with those client computers (e.g., request/response streams R1, R2 and R3) into an individual server TCP connection 124. This allows multiple clients 12 to connect to server system 22 using only one server socket 124a. This provides a significant advantage over conventional client-server connection schemes, which would require three separate server sockets to provide connections for all three clients. By using only one server socket, instead of three, socket-related overhead processing on the server side is reduced, allowing a greater number of connected clients to be serviced at one time.

As indicated, networking device 26 is configured to selectively route HTTP requests and responses between client and server sockets. For example, as indicated by HTTP request/response streams R1, R2 and R3, networking device 26 is configured to receive HTTP requests from one or more of client computers 12, and selectively route those requests via one of server connections 124 to an individual server socket 124a. Networking device is also configured to receive HTTP responses from server system 22, and route those responses back to the appropriate originating client 12.

Networking device 26 may be configured to multiplex requests from multiple clients, for example by taking HTTP requests from multiple clients and routing those requests to server system 22 via a single server connection 124. For example, FIG. 3 depicts multiplexing of HTTP requests from the topmost three clients onto a single server connection 124. The process is typically referred to as multiplexing because the traffic from a number of client-side connections 120 is routed to a smaller number of server-side connections 124, and also because plural client-side connections 120 may be routed to a single server-side connection 124.

Various methods may be used to combine the requests for transmission via a single server-side connection 124. Typically, a multiplexing state agent, shown at M1–M6, is assigned to each client-side socket 120b on the networking device. Each multiplexing state agent is configured to, for each request received from the client, route the request to an optimal server-side socket 124b on the networking device, for transmission to a server 14 of server system 22. When a response to the request is received from the server on the server-side socket 124b, the multiplexing state agent is configured to route the request back to the client-side socket 120b for the requesting client. The multiplexing state agent is free to route subsequent requests from the same client to an optimal server-side socket 124b, whether that be a different server socket, or the same server socket as used for previous requests. While typically each multiplexing state agent is configured to route requests from only one client-side socket 120b to an optimal one of a plurality of server-side sockets 124b, it will be appreciated that alternatively a single multiplexing state agent may be configured to route requests from more than one client-side socket 120b to (1) an optimal one of a plurality of server-side sockets 124b, and/or (2) a single server-side socket 124b.

Networking device 26 may be further configured to demultiplex the response stream received from server-side sockets 124b in response to the client requests. Specifically, a series of responses received from a particular server socket is processed by the multiplexing state agents managing transactions with that socket, to unbundle the response stream into discrete responses or streams corresponding to an individual one of clients 12. Each multiplexing agent is configured to detect those responses on the server-side socket 124b that correspond to requests from the client with which the agent is associated, and route the responses back to the originating client, via the client-side socket 120b for the originating client. This process is referred to as demultiplexing because a series of responses from a single server-side connection 124 is broken up and routed over a plurality of client connections 120 to a plurality of clients 12.

As indicated, client-side connections 120 may correspond with server-side connections 124 in various ways. For example, the system may be operated so that all client connections are multiplexed to an individual server connection. Where multiplexing is employed, networking device 26 is configured to multiplex HTTP requests provided from two or more client connections (e.g., the connections corresponding to R1, R2 and R3) into a single server connection, such that only one server socket need be opened. Alternatively, multiple server connections may be employed, where each server connection corresponds either to an individual client connection, or is multiplexed so as to correspond to multiple client connections. In any event, it will normally be desirable that the server connections be fewer in number than the client connections, in order to achieve an optimal reduction of socket-related overhead processing on the server side of the system. Regardless of the particular multiplexing configuration, networking device 26 is further configured to demultiplex the responses generated by server system 22, and cause those responses to be selectively routed to the appropriate originating client 12.

Where multiple server connections are available, various optimization schemes may be employed to reduce delay and otherwise improve performance. In particular, networking device 26 may be configured to route HTTP requests to an optimal server socket, which typically is a least busy server socket. To determine the optimal server socket, multiplexor/demultiplexor 80 (FIG. 5) may be configured to detect the response time at each server socket 124*a* by monitoring corresponding server-side sockets 124*b* on the networking device. The server socket with the fastest response time may be determined to be the least busy server socket. Alternatively, or additionally, various sockets may be monitored to determine which server socket has the fewest unfulfilled requests. In addition, routing may be effected based on which of the server sockets was the last to be accessed.

In addition to or instead of the above-described optimization techniques, networking device 26 may be configured to determine the type of request being made and/or the type of data being requested and use that information to effect optimal routing. For example, all image requests may be handled by a predetermined set of sockets on server system 22, while all HTML requests may be handled by a different predetermined set of sockets. In addition, certain sockets may be designated to handle specified protocols or protocol versions. For example, one set of sockets could be designated for all HTTP 1.0 requests, with another set being designated to handle HTTP 1.1 requests.

Regardless of the particular implementation, these optimization techniques increase the overall efficiency and response time of server system 22 by adjusting the flow of requests away from slow, congested server sockets and toward fast congestion-free server sockets. These optimization techniques may be employed in the described networking devices of the present invention, in addition to or instead of the routing, multiplexing and demultiplexing features discussed above.

Typically, the connections between networking device 26, server system 22 and clients 12 (e.g., connections 120 and 124) are persistent TCP connections. Persistent TCP connections are connections that remain open until explicitly commanded to close or until the server times-out the connection. Alternatively, a connection other than a persistent TCP connection may be used. Effective use of persistent connections is a significant advantage of the present invention over prior systems. Often the persistence feature is not used in conventional networking systems, or is only partially used, because of the significant amount of per-connection overhead placed on the system. As discussed above, this overhead fundamentally limits the number of clients that can be connected at any one time. Thus, to provide access to a large number of potential connected clients, many existing systems periodically terminate client connections, to allow others access to the system. This effectively is a disabling of the persistence feature available in newer networking protocols. The failure to leverage persistence is particularly a drawback in secure environments, such as SSL, where setting up and tearing down TCP connections involves key exchanges and other overhead intensive tasks relating to security. By reducing the excessive overhead that necessitates periodic terminating of client connections, networking device is able to establish and maintain persistent connections with clients and servers.

It will be appreciated that the described networking devices and systems are extremely flexible, and may be configured in a nearly limitless number of ways to enhance the performance of client-server networking systems. Other network device implementations are described in co-pending U.S. patent application Ser. Nos. 09/680,675, 09/680,997, and 09/680,998, filed Oct. 6, 2000, Nos. 60/239,552 and 60/239,071, filed Oct. 10, 2000, No. 60/287,188, filed Apr. 27, 2001, and No. 60/308,234 filed Jul. 26, 2001, and No. 60/313,006 filed Aug. 16, 2001, the disclosures of each of which are herein incorporated by reference, in their entirety and for all purposes. The features of these devices may variously be implemented in connection with the networking devices and systems of the present invention.

Figure 7:
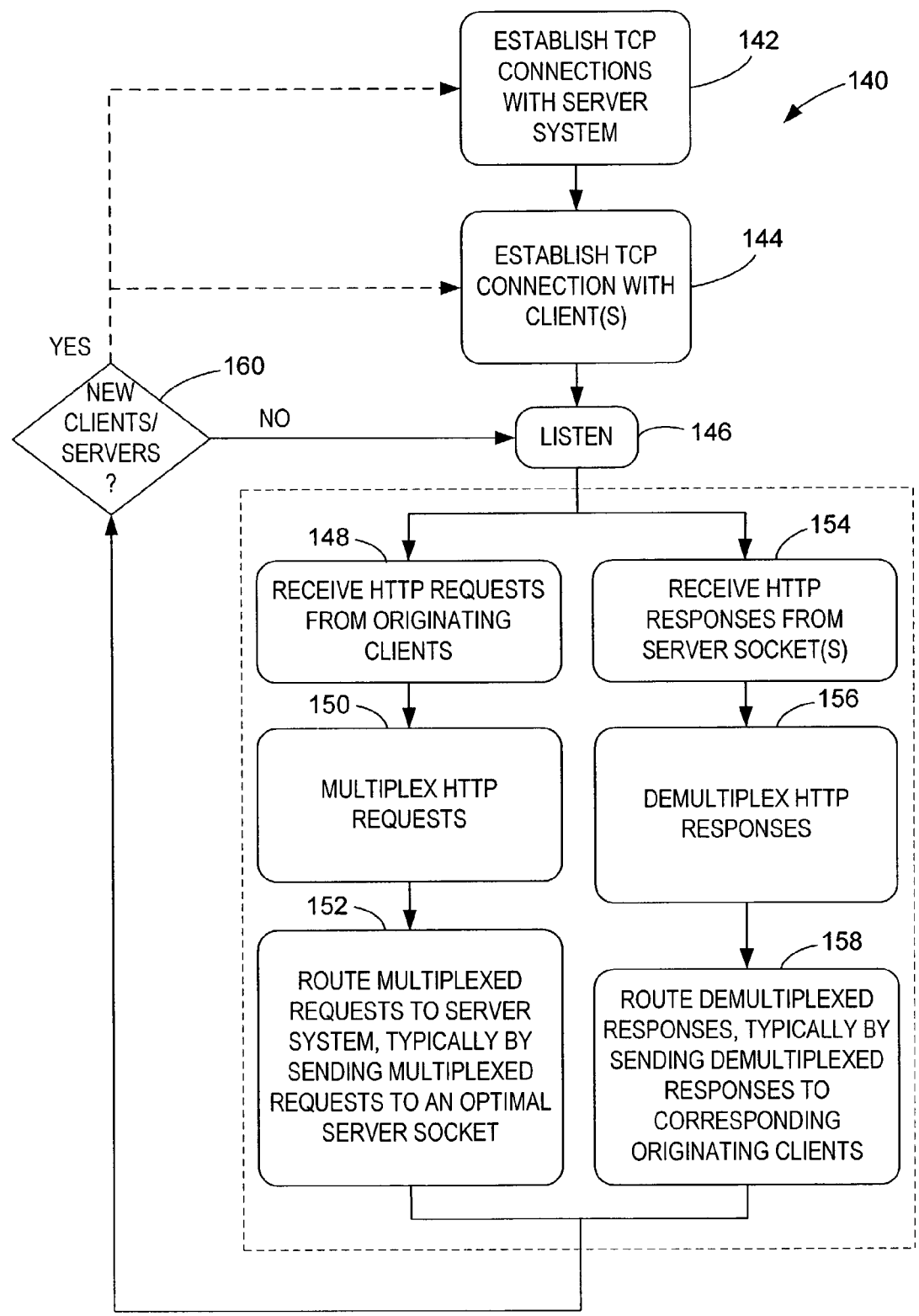
FIG. 7 is a flowchart of a method of demultiplexing and multiplexing HTTP requests and responses according to one embodiment of the present invention.

Turning to FIG. 7, a method 140 may be practiced according to the present invention. The steps of method 140 are typically accomplished by networking device 26, in connection with remote clients 12 and server system 22 communicating via the described network connections. Alternatively, the method may be accomplished by dedicated software on server system 14, or by some other suitable software or hardware device. At 142, the method typically includes establishing persistent TCP connections between networking device 262 and one or more sockets on server system 14. At 144, the method typically includes establishing persistent TCP connections between networking device 26 and one or more remote clients 12. At 146, the method further includes listening for HTTP requests from originating remote clients 12 and/or for HTTP responses from various server sockets.

When HTTP requests are detected at networking device 26, method 140 continues, at 148, with receiving HTTP requests at one or more client-side sockets 120*b*. Method 100 further includes, at 150, multiplexing HTTP requests so that the multiplexed requests may be transmitted to the server system via a single TCP connection. At 152, the method further includes routing the requests to the server system, typically by sending the multiplexed requests to an optimal server socket.

Prior to step 152, method 140 may also include monitoring server sockets to determine an optimal server socket. The optimal server socket may be determined by identifying a server socket with a least-lengthy response time. Alternatively, the optimal server socket may be determined by determining a last-accessed server socket, determining a server socket with the fewest number of unfulfilled requests, determining the type or size of data being requested or other parameters related to the HTTP requests, or by weighing all or some of these conditions. By determining an optimal server socket, the multiplexor/demultiplexor is able to improve performance by facilitating more efficient use of server resources.

When HTTP responses are detected at the multiplexor/demultiplexor at step 146, method 140 proceeds to 154, and includes receiving HTTP responses from the server system. The multiplexor/demultiplexor typically is configured to determine the destination of the HTTP responses. At 156, the method includes demultiplexing HTTP responses received from server system, in order to permit selective routing and delivery of certain of those responses to the appropriate originating client. At 158, method 140 includes sending the demultiplexed responses to the originating remote client.

When there is a new remote client or server detected at 160, the method includes returning to step 144 to establish a persistent TCP connection with the new remote client, or returning to step 142 to establish a persistent TCP connection with the new server, respectively. It will also be appreciated that networking device 26 may be configured to establish a plurality of TCP connections with a plurality of servers and a plurality of remote clients, and therefore may be configured to handle HTTP requests and HTTP responses from multiple servers and remote clients at once.

Similar to the devices and systems described above, the described method enhances the performance of client-server networking systems. This is accomplished through multiplexing and demultiplexing of HTTP requests/responses, in order to reduce overhead processing that results in conventional systems from opening a server socket for each client computer connecting to the server. This also allows for fuller utilization of the persistent connection features that are now available in connection with HTTP and other protocols. Additionally, or alternatively, the method may include selection of optimal server sockets, in order to further enhance server sufficiency.

Figure 8:
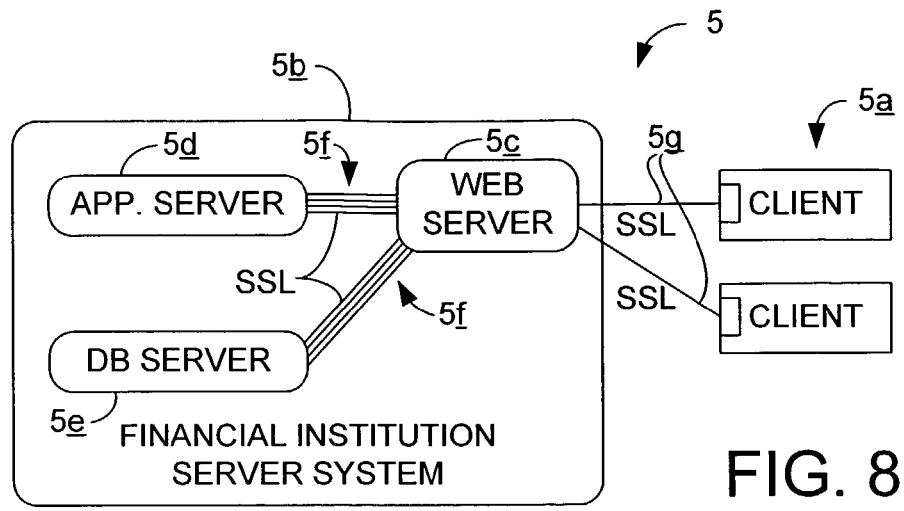
FIG. 8 is a schematic view of a prior art financial institution networking system.

Referring now to FIG. 8, a prior art networking system used in some financial institutions is shown generally at 5. Prior art system 5 includes one or more clients 5a and a server system 5b, both of which are configured to communicate using HTTP requests and responses sent over secure client-side Secure Socket Layer (SSL) connections 5g. Server system 5b includes a front-end web server 5c, which is configured to receive and to respond to requests from clients 5a. Server system 5b also includes back-end application servers 5d and database servers 5e, which are configured to provide back-end support to web server 5c and process various transactions requested by clients 5a.

The establishment of each SSL connection 5g requires a complicated and time consuming handshaking process between client 5a and web server 5c, in which security keys and other information are exchanged and an SSL session ID is established and cached at the client and server. This overhead processing often results in delays for completing transactions requested by clients 5a. Under heavy loads, the client may "time-out" and tear down the SSL connections 5g due to slow response from the web server 5c, or the front-end web server 5c itself may "black out" and not be able to respond at all to new client requests.

These delay problems are amplified by the security policies of many institutions, which require all internal transactions within server system 5b to be conducted over secure connections as well. Thus, connections 5f between back-end servers 5d, 5e and front-end web server 5c are SSL connections 5f, which require the time-intensive set-up process described above. While it may be faster to send traffic over back-end connections without any encryption, that is, in "clear text" form, the use of clear text on back-end connections is an unacceptable security risk to many financial institutions.

Another factor contributing to delay in prior art system 5 is that for each client request for which web server 5c determines that a back-end server operation is required, a new back-end SSL connection 5f is typically set up between the web server and the appropriate back-end server 5d or 5e. Once the back-end server operation has been completed, the web server tears down the newly established SSL connection 5f between the back-end server and the web server, and responds to client 5a accordingly. Under heavy loads, web server 5c must manage not only thousands of client-side SSL connections 5e, but also thousands of back-end SSL connections as well. This significantly slows down response time of the server system 5b as a whole.

Figure 9:
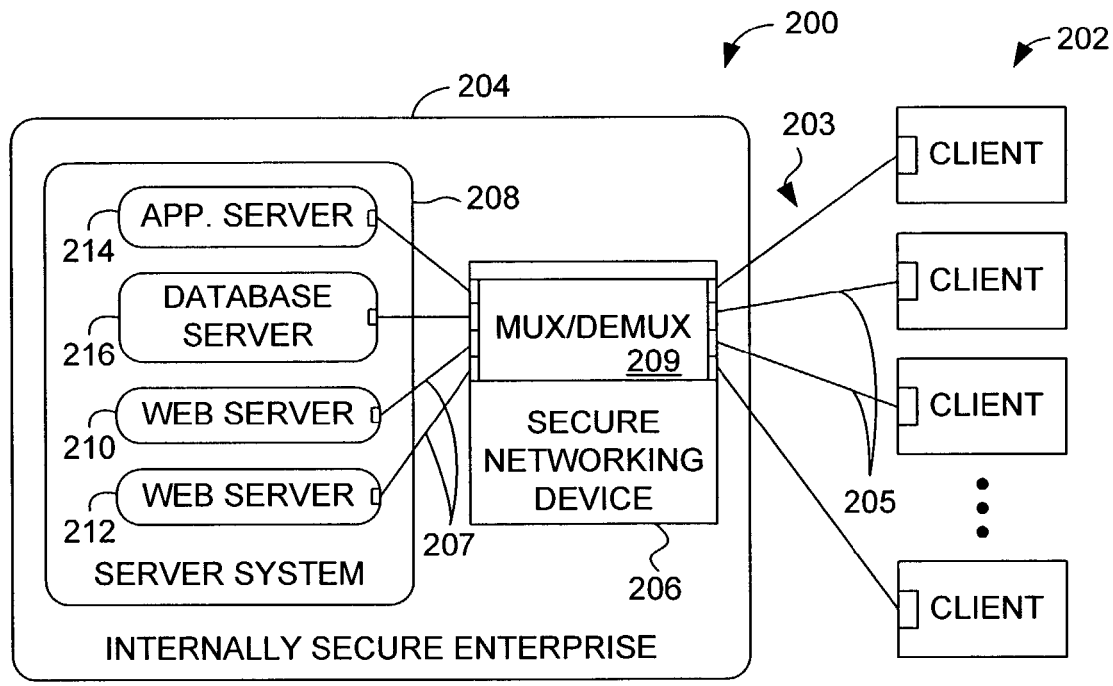
FIG. 9 is schematic view of a secure HTTP multiplexor/demultiplexor system according to one embodiment of the present invention.

Turning now to FIG. 9, a secure HTTP multiplexor/demultiplexor system according to one embodiment of the present invention is shown generally at 200. System 200 typically includes a plurality of remote clients 202 configured to connect to internally secure enterprise 204 via a network 203, typically the Internet, using secure connections 205 established according to SSL or other security protocol. In order to avoid the delays associated with prior systems, system 200 includes a secure networking device 206 configured to establish internally secure network connections 207 with one or more networked devices of internal server system 208, via a computer network such as a Local Area Network (LAN). Typically, secure networking device 206 is capable of establishing secure client-side connections 205 with each of remote clients 202, as well as secure server-side connections 207 with each of the various servers within sever system 208.

Secure networking device 206 typically includes an HTTP multiplexor/demultiplexor 209, which is configured to route traffic from a plurality of secure client-side connections 205 over a smaller number of semi-permanent secure server-side connections 207. This avoids the delay associated with the prior art system described above, which required that a separate back-end SSL connections for each client request requiring back-end server support. HTTP multiplexor/demultiplexor may also be referred to as an SSL multiplexor/demultiplexor, when used with SSL encapsulated traffic. In addition to HTTP multiplexor/demultiplexor 209, secure networking device 206 may include other components, similar to devices 26, 26' in FIGS. 5 and 6; however, for simplicity the functions of HTTP multiplexor/demultiplexor 209 will be described below with reference to secure networking device 206 generally.

Server system 208 typically includes one or more front-end web servers 210, 212, which communicate with clients 202, and one or more back-end servers, such as application server 214 and database server 216. Back-end servers 214, 216 are typically configured to communicate with the front-end servers 210, 212, to provide back-end support for processing transactions requested by client 202. One exemplary setting in which system 200 may be used is a financial institution, where, for example, web servers 210 and 212 may serve aspects of an on-line investing website, application server 214 may execute an analysis program that tracks the performance of a user's portfolio, and database server 216 may manage a database that contains a user's portfolio holdings and investment history. Of course, it will be appreciated that the various embodiments of the present invention may be used in a wide variety of other secure networking scenarios without departing from the spirit and scope of the present invention.

Figure 10:
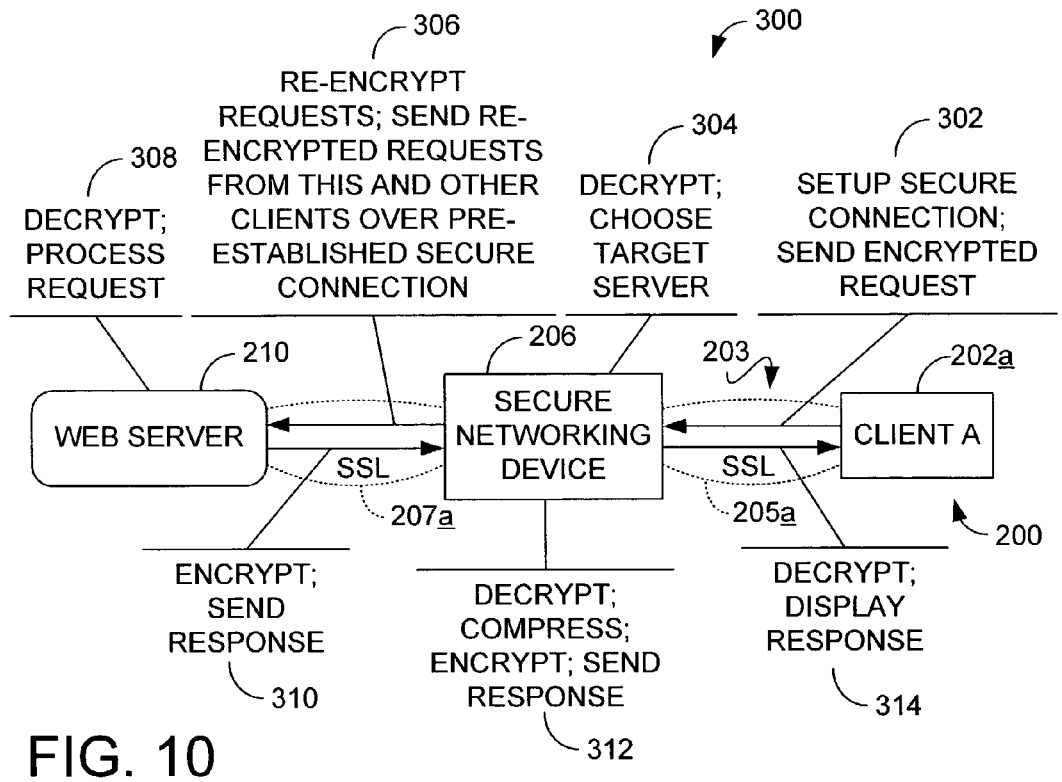
FIG. 10 is a step-by-step illustration of a method for securely multiplexing HTTP requests and responses according to one embodiment of the present invention.

FIG. 10 shows one exemplary method 300 by which system 200 may operate. At 302, the method typically includes establishing a secure connection 205a between a remote client 202a and secure networking device 206, via computer network 203. Typically, the secure connection 205a, like other secure connections described herein, is set up according to the SSL protocol. Alternatively, virtually any other security protocol may be used which establishes a secure connection for use with a series of requests and responses exchanged between clients 202 and networking device 206. Also at 302, the method typically includes encrypting the request, and sending the encrypted request to secure networking device 206.

Figure 12:
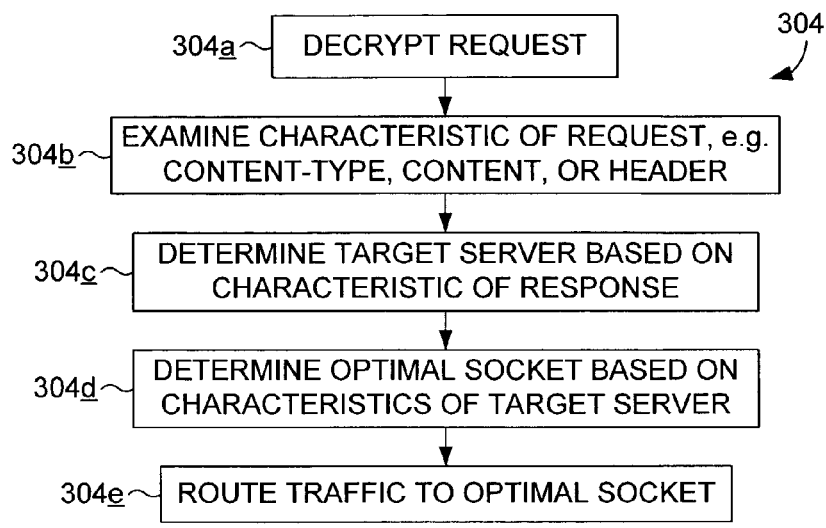
FIG. 12 is a flowchart of one exemplary method for accomplishing the step of choosing a target server for a request, shown in FIG. 10.

At 304, the method typically includes decrypting the encrypted request from client 202, reading the request, and selecting a target server for the request based on the content-type content, header, or other characteristic of the request. For example, all requests with an "HTTP" header or content-type may be routed to web server 210. As shown in FIG. 12, step 304 is typically accomplished by, at 304a, decrypting the response and at 304b, examining one or more characteristics of the request, such as the requested content-type, a request header, or the content of the request. At 304c the method typically includes determining a target server based on the request characteristic(s). At 304d, the method typically includes determining an optimal server-side socket, such as 206b' in FIG. 13, from among server-side sockets 206b, and, at 304e, routing traffic from the originating client-side socket 206a to the optimal server side socket 206b'. Methods for determining the optimal socket on the target server are discussed above with relation to step 152 of FIG. 7. For example, the least busy server socket may be optimal, or the next server socket in a round-robin may be optimal.

Figure 13:
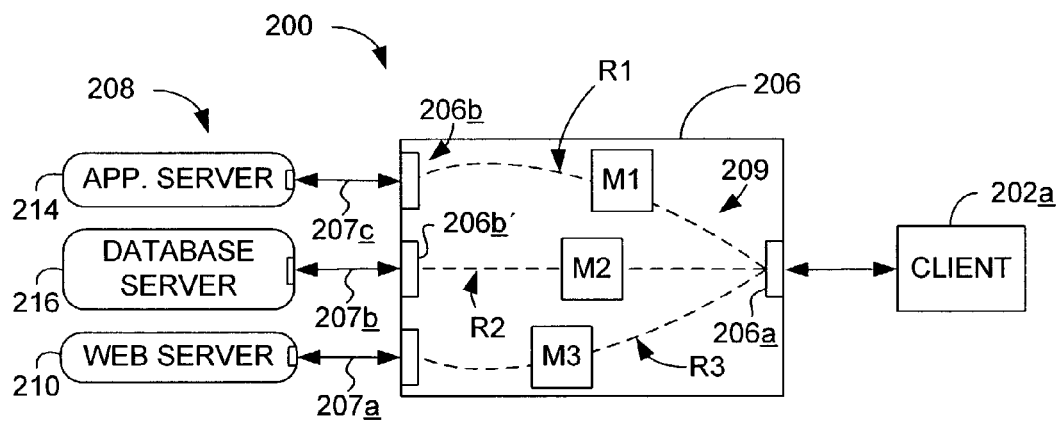
FIG. 13 is a schematic view of the system of FIG. 9, showing a plurality of client requests routed over pre-established secure connections to a variety of servers in a server system by a secure networking device.

FIG. 13 illustrates the routing of requests from a client to one or more target servers, via secure networking device 206. Client 202a is shown having originated requests R1–R3. These requests are routed by multiplexing state agents M1–M3 to different server-side sockets 206b, which correspond to server-side secure connections 207a, 207b, and 207c, and to web server 210, database server 216, and application server 214, respectively. For each of the requests R1–R3, the secure networking device is configured to determine a target server and an optimal server socket, and to route the request to the optimal socket on the target server accordingly. For example, in the case of R2, the target server is database server 212, and the optimal server socket is shown at 206b'. It will be noted that, as used herein with respect to the embodiments shown in FIGS. 9–14, the term "server socket" is sometimes used interchangeably to refer to both a server-side socket on networking appliance 206, and a server socket on one of the servers of server system 208, since routing a request to a server-side socket on networking appliance 206 inevitably leads to the request being forwarded to a corresponding server socket on the server system.

Referring back to FIG. 10, method 300 typically includes, at 306, re-encrypting the requests from the client, and sending the re-encrypted requests from the networking device to the optimal socket on a target front-end server, such as web server 210, via a pre-established secure server-side connection 207a, which may also be referred to as a secure "front-end" server-side connection 207a. Typically, the secure server-side connection 207a is pre-established on boot-up of networking device 206, before the current client request is received at the networking device. For this reason, server-side connections 207 may be referred to as "pre-established secure connections." The secure networking device may be configured to periodically tear down and reestablish each of the pre-established secure server-side connections 207 at predetermined intervals of time, for additional internal security. It will be understood that requests from a plurality of originating clients may be routed to web server 214 over the same pre-established secure connection 207a.

At 308, the method further includes, at the web server 210, decrypting the request received from networking device 206, processing the request, and formulating a response. At 310 the method further includes encrypting the response and sending it, via the already established secure connection 207a, from web server 210 to secure networking device 206.

At 312, the method further includes receiving and decrypting the response at the secure networking device, compressing the response via a compression algorithm (typically the GZIP compression algorithm), encrypting the response to be sent over the secure connection 205a established with client 202, and sending the response over the secure connection 205a to client 202. At 314, the method further includes decrypting the response at the client, and displaying the contents of the response on the client device. Prior art systems that send traffic via the SSL protocol are unable also to compress this traffic using compression algorithms such as GZIP, thus further slowing transfer rates. However, in this embodiment of the present invention, there is the advantage of being able to decrypt secure messages on the fly (that is, in real time), compress those messages within a secure networking device, and send the messages over a secure connection to the client. Since the "final mile" of secure connection 205a often crosses a low bandwidth transmission medium, such as a residential telephone line, compression of responses from the server 210 on the fly saves considerable transfer time over prior art systems.

Figure 11:
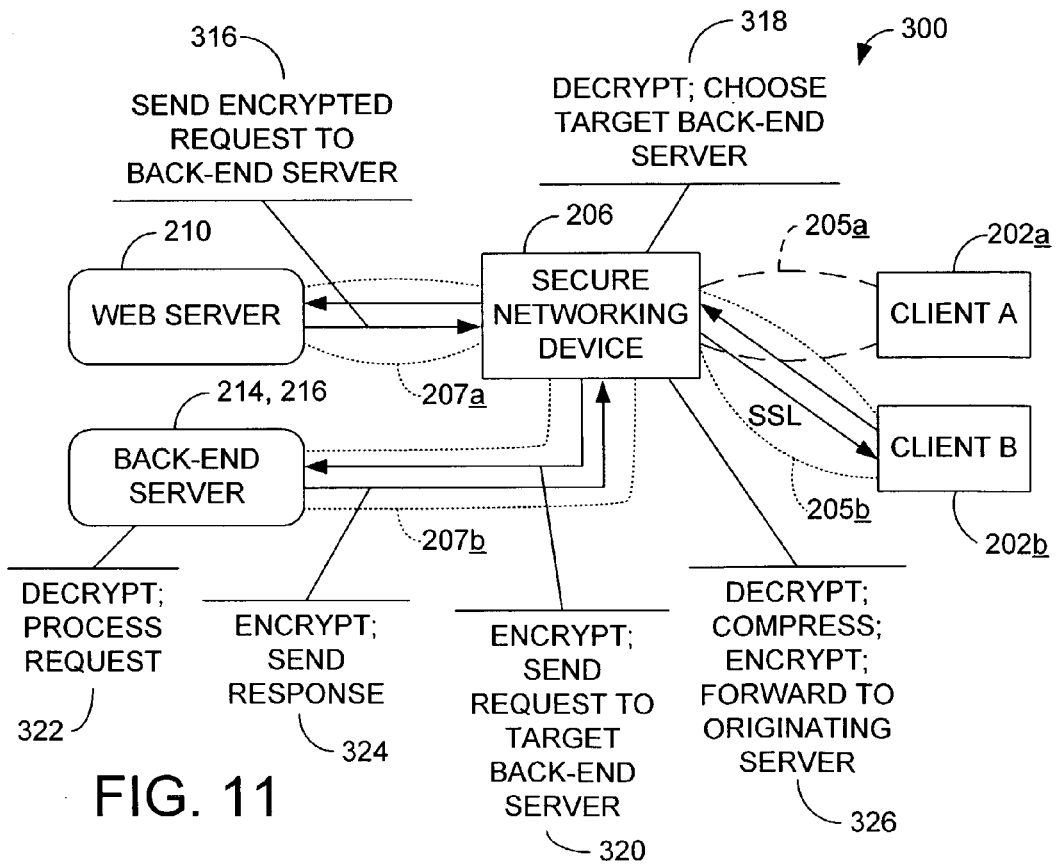
FIG. 11 is a continuation of the step-by-step illustration of the method of FIG. 10.

FIG. 11 shows a continuation of method 300, illustrating the interaction between web server 210 and back-end servers 214, 216. At 316, the method includes sending an encrypted request from web server 210 to networking device 206 via secure connection 207a, the request being destined for a back-end server 214, 216. At 318, the method includes receiving and decrypting the request at secure networking device 206, and choosing a target back-end server and an optimal server socket to service the request. The target back-end server is typically chosen by examining the request from the front-end web server, which typically identifies an IP address of the target server, or alternatively, by examining the requested content-type, content, or header in the request from the front-end web server. The optimal server socket on the target back-end server is selected as described above with respect to the target front-end server, for example, by examining response times at each of several back-end server sockets on networking device 206, and selecting the socket with the fastest response time, and therefore the least load. A round robin approach or other selection mechanism may also be used.

At 320, the method further includes re-encrypting the request and sending it to the optimal server socket on the target back-end server via pre-established secure server-side connection 207b, which may also be referred to as a secure "back-end" server-side connection 207b. As described above, secure server-side connection 207b, is typically pre-established on boot-up of the networking device, although it may periodically be torn down and reestablished for security reasons. It will be appreciated that networking device 206 is configured to route traffic from a plurality of requesting sources, such as other clients, front-end servers, or back-end servers, to target back-end server 214, 216 using pre-established secure connection 207b, without the time consuming process of establishing a separate secure connection for each requesting source.

At 322, the method further includes decrypting the request at the target back-end server and processing the request, to formulate a response. At 324, the method includes encrypting the response and sending the response to networking device 206, via secure server-side connection 207b. At 326, the method includes decrypting the response at the networking device, compressing the response, and forwarding the response to the originating server 210.

Front-end web server 210 is configured to receive the response from the back-end server, and send a suitable response to the requesting client 202a, based on the response from the back-end server, via secure server-side connection 207a and secure client-side connection 205a. It will be appreciated that requests may also be sent from requesting client 202b, via a second secure client-side connection 205b and secure server-side connection 207a. Similarly, requests from a plurality of front-end servers may be sent to a back-end server through networking device 206 via a common back-end secure server-side connection 207b. For this reason, secure networking device 206 is said to multiplex requests from a plurality of secure client-side connections over a single secure server-side connection to front-end web server 210. Similarly, secure networking device 206 is said to multiplex traffic from a plurality of front-end servers over a common secure back-end connection to a target back-end server. Of course, device 206 may use more than one server-side connection to a single server, and the term "multiplexing" may also be used to refer to the process of combining traffic from a larger number of secure client-side connections 205 over a smaller number of secure server-side connections 207, or from a larger number of front-end server connections 207a to a smaller number of back-end server connections 207b. As the responses are sent back from the server to the requesting client, they are demultiplexed from the combined stream of requests flowing over server-side connections 207 to travel to the appropriate requesting client. These multiplexing and demultiplexing abilities described herein are accomplished by HTTP multiplexor/demultiplexor 209, also referred to as SSL multiplexor/demultiplexor 209 of networking device 206.

FIG. 13, described above, shows one possible mechanism of HTTP multiplexor/demultiplexor 209 for multiplexing requests according to the present invention. Client 202 sends requests R1–R3, which are destined for application server 214, database server 216, and web server 210, respectively. These requests are routed by multiplexing state agents M1–M3 of HTTP multiplexor/demultiplexor 209, to different server-side sockets 206b, and thus to secure server-side connections 207a, 207b, and 207c, accordingly. Networking device 206 is configured to route the responses to these requests back to the originating client via client side socket 206a.

Figure 14:
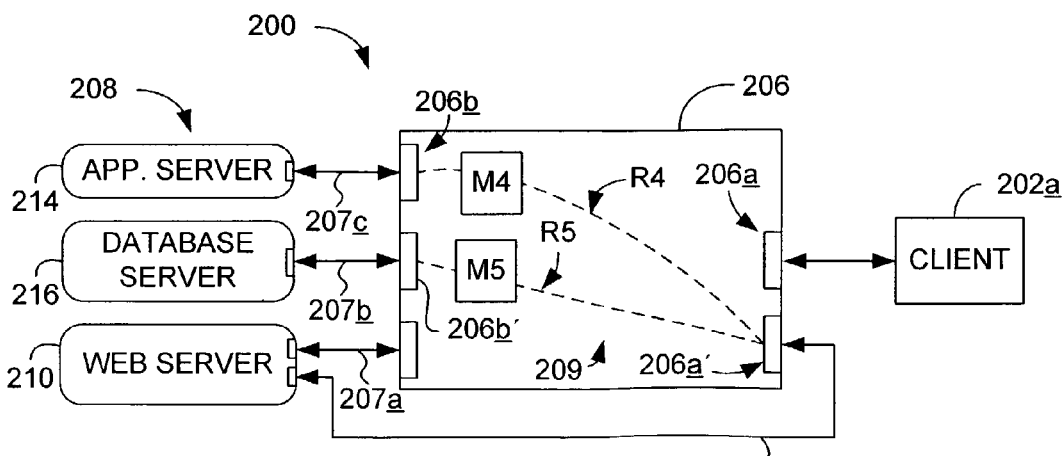
FIG. 14 is a schematic view of the system of FIG. 9, showing a plurality of back-end requests from a web server being routed to back-end servers via the secure networking device and pre-established secure connections between the back-end servers and the networking device.

FIG. 14 shows HTTP multiplexor/demultiplexor 209 routing requests R4 and R5 from front-end web server 210 to back-end server 214, 216, using multiplexing agents M4 and M5. In order to accomplish this routing, requests from web server 210 are typically routed through the request side of networking device 206, through secure connection 207c, in a manner similar to requests from clients 202. Networking device 206 is configured to route the responses to these front-end web server requests back to the requesting web server 210 via the multiplexing agents R4, R5. The web server may use the data from the back-end servers to generate a response to a request from client 202, and subsequently may send the response to client 202, in the manner described above.

The above described embodiments enable a plurality of clients to send traffic to a front-end server via a secure networking device. The traffic is routed by the secure networking device from multiple client-side secure connections over one or a smaller number pre-established secure server-side connections between the networking device and the front-end server. Because these secure server-side connections are not torn down and reestablished for each different client, response time is lowered. In addition, the networking device is configured to route traffic from a plurality of secure connections to front-end servers to one or a smaller number of pre-established secure connections to back-end servers, without repeatedly tearing down and reestablishing back-end server connections for each requesting server, further reducing response time as compared to the prior art systems. Alternatively, a larger number of back-end server-side connections than front-end server-side connections may be used, for example, where a great many front-end servers access only a few back-end servers.

In addition, the present invention has the advantage of being able to compress the traffic flowing through the networking device in real time, on the fly, thus further reducing the overall transfer time for the response. Finally, periodic renegotiation of server-side secure connections has increased security benefits over prior art systems. Increased response times and higher security levels lead to a more pleasurable and reassuring experience for computer users, and increased exposure and revenues for vendors selling their wares on-line.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. A secure networking device for use in mediating networking communications between a server and a plurality of clients configured to communicate via the Hypertext Transfer Protocol (HTTP), the secure networking device comprising:

an HTTP multiplexor/demultiplexor configured to receive HTTP requests from the plurality of clients via a plurality of client-side connections, and to route the requests from the plurality of clients to a target server over a common, secure, server-side connection to the server;

wherein the HTTP multiplexor/demultiplexor is further configured to receive a plurality of responses to the HTTP requests from the target server, via the common, secure, server-side connection, and to route each of the plurality of responses back to an originating client;

wherein the HTTP multiplexor/demultiplexor is further configured to compress each of the responses in real time before routing each response to an originating client.

2. The secure networking device of claim 1, wherein the responses are received in encrypted form at the HTTP multiplexor/demultiplexor from the target server, and where the HTTP multiplexor/demultiplexor is further configured to decrypt each responses, and encrypt it in real time before routing it to an originating client.

3. The secure networking device of claim 1, wherein the HTTP multiplexor/demultiplexor is configured to pre-establish the secure server-side connection prior to receiving the plurality of requests.

4. A secure networking device for use in mediating networking communications between a server and a plurality of clients configured to communicate via the Hypertext Transfer Protocol (HTTP), the secure networking device comprising:
- an HTTP multiplexor/demultiplexor configured to receive HTTP requests from the plurality of clients via a plurality of client-side connections, and to route the requests from the plurality of clients to a target server over a common, secure, server-side connection to the server;
- wherein the HTTP multiplexor/demultiplexor is configured to pre-establish the secure server-side connection on boot-up, prior to receiving the plurality of requests.

5. A secure networking device the use in mediating networking communications between a server and a plurality of clients configured to communicate via the Hypertext Transfer Protocol (HTTP), the secure networking device comprising:
- an HTTP multiplexor/demultiplexor configured to receive HTTP requests from the plurality of clients via a plurality of client-side connections, and to route the requests from the plurality of clients to a target server over a common, secure, server-side connection to the server;
- wherein the HTTP multiplexor/demultiplexor is configured to periodically tear down and reestablish the secure server-side connection.

6. The secure networking device of claim 5, wherein the server-side connection is one of a plurality of server-side connections to the target server, each server-side connection having an associated server-side device socket and a server socket.

7. The secure networking device of claim 6, wherein the HTTP multiplexor/demultiplexor is configured to select an optimal server socket to which to send each of the plurality of requests.

8. The secure networking device of claim 6, wherein the number of server-side connections is smaller than the number of client-side connections, and the HTTP multiplexor/demultiplexor is configured to multiplex HTTP traffic between the larger number of client-side connections and the smaller number of server-side connections.

9. The secure networking device of claim 6, wherein the target server is a front-end server and the secure server-side connection is a front-end secure server-side connection.

10. The secure networking device of claim 6, wherein the server-side connections connect to a plurality of servers, and the HTTP multiplexor/demultiplexor is configured to select a target server based on a characteristic of the request.

11. The secure networking device of claim 10, wherein the characteristic of the request is selected from the group consisting of content-type, content, and header.

12. A secure networking device for use in mediating networking communications between a server and a plurality of clients configured to communicate via the Hypertext Transfer Protocol (HTTP), the secure networking device comprising:
- an HTTP multiplexor/demultiplexor configured to receive HTTP requests from the plurality of clients via a plurality of client-side connections, and to route the requests from the plurality of clients to a target server over a common, secure, server-side connection to the server;
- wherein the server-side connection is one of a plurality of server-side connections to the target server, each server-side connection having an associated server-side device socket and a server socket;
- wherein the HTTP multiplexor/demultiplexor is configured to select an optimal server socket to which to send each of the plurality of requests; and
- wherein the HTTP multiplexor/demultiplexor is configured to select an optimal server socket at least in part by examining response times of the server sockets.

13. A secure networking device for use in mediating networking communications between a server and a plurality of clients configured to communicate via the Hypertext Transfer Protocol (HTTP), the secure networking device comprising:
- an HTTP multiplexor/demultiplexor configured to receive HTTP requests from the plurality of clients via a plurality of client-side connections, and to route the requests from the plurality of clients to a target server over a common, secure, server-side connection to the server;
- wherein the server-side connection is one of a plurality of server-side connections to the target server, each server-side connection having an associated server-side device socket and a server socket;
- wherein the HTTP multiplexor/demultiplexor is configured to select an optimal server socket to which to send each of the plurality of requests; and
- wherein the HTTP multiplexor/demultiplexor is configured to select an optimal server socket at least in part by choosing a next server socket in a round robin.

14. A secure networking device for use in mediating networking communications between a server and a plurality of clients configured to communicate via the Hypertext Transfer Protocol (HTTP), the secure networking device comprising:
- an HTTP multiplexor/demultiplexor configured to receive HTTP requests from the plurality of clients via a plurality of client-side connections, and to route the requests from the plurality of clients to a target server over a common, secure, server-side connection to the server;
- wherein the target server is a front-end server and the secure server-side connection is a front-end secure server-side connection; and
- wherein the HTTP multiplexor/demultiplexor is configured to set up the front-end secure server-side connection using the Secure Socket Layer (SSL) protocol.

15. The secure networking device of claim 14, wherein the front-end server is a web server.

16. The secure networking device of claim 14, wherein the server-side connection is one of a plurality of server-side connections to the target server, each server-side connection having an associated server-side device socket and a server socket.

17. The secure networking device of claim 16, wherein the HTTP multiplexor/demultiplexor is configured to select an optimal server socket to which to send each of the plurality of requests.

18. The secure networking device of claim 17, wherein the HTTP multiplexor/demultiplexor is configured to select an optimal server socket at least in part by examining response times of the server sockets.

19. The secure networking device of claim 17, wherein the HTTP multiplexor/demultiplexor is configured to select an optimal server socket at least in part by choosing a next server socket in a round robin.

20. The secure networking device of claim 16, wherein the number of server-side connections is smaller than the number of client-side connections, and the HTTP multiplexor/demultiplexor is configured to multiplex HTTP traffic between the larger number of client-side connections and the smaller number of server-side connections.

21. The secure networking device of claim 16, wherein the server-side connections connect to a plurality of servers, and the HTTP multiplexor/demultiplexor is configured to select a target server based on a characteristic of the request.

22. The secure networking device of claim 21, wherein the characteristic of the request is selected from the group consisting of content-type, content, and header.

23. The secure networking device of claim 14, wherein the HTTP multiplexor/demultiplexor is further configured to pre-establish a secure server-side connection to a back-end server.

24. The secure networking device of claim 23, wherein the back-end server is selected from the group consisting of an application server and a database server.

25. The secure networking device of claim 23, wherein the HTTP multiplexor/demultiplexor is further configured to pre-establish the secure sever-side connection to the back-end server using the Secure Socket Layer (SSL) protocol.

26. The secure networking device of claim 23, wherein the HTTP multiplexor/demultiplexor is further configured to periodically tear down and reestablish the secure server-side connection to the back-end server.

27. The secure networking device of claim 23, wherein the HTTP multiplexor/demultiplexor is further configured to receive requests from the front-end server and to route the requests to the back-end server over the pre-established secure server-side connection to the back-end server.

28. The secure networking device of claim 23, wherein the front-end server is one of a plurality of front-end servers, and the HTTP multiplexor/demultiplexor is further configured to receive requests from the plurality of font-end servers and to route the requests from the plurality of front-end servers to the back-end servers over the secure server-side connection to the back-end server.

29. A secure networking device for use in mediating networking communications between a server and a plurality of clients configured to communicate via the Hypertext Transfer Protocol (HTTP), the secure networking device comprising:
   an HTTP multiplexor/demultiplexor configured to receive HTTP requests from the plurality of clients via a plurality of client-side connections, and to route the requests from the plurality of clients to a target server over a common, secure, server-side connection to the server;
   wherein the target server is a front-end server and the secure server-side connection is a front-end secure server-side connection; and
   wherein the HTTP multiplexor/demultiplexor is further configured to pre-establish a secure server-side connection to a back-end server.

30. The secure networking device of claim 29, wherein the server is selected from the group consisting of an application server and a database server.

31. The secure networking device of claim 29, wherein the HTTP multiplexor/demultiplexor is further configured to pre-establish the secure server-side connection to the back-end server using the Secure Socket Layer (SSL) protocol.

32. The secure networking device of claim 29, wherein the HTTP multiplexor/demultiplexor is further configured to periodically tear down and re-establish the secure server-side connection to the back-end server.

33. The secure networking device of claim 29, wherein the HTTP multiplexor/demultiplexor is further configured to receive requests from the front-end server and to route the requests to the back-end server over the pre-established secure server-side connection to the back-end server.

34. The secure networking device of claim 33, wherein the front-end server is one of a plurality of front-end servers, and HTTP multiplexor/demultiplexor is further configured to receive requests from the plurality of front-end servers and to route the requests from the plurality of front-end servers to the back-end server over the secure server-side connection to the back-end server.

35. A secure networking system, a comprising:
   a plurality of clients configured to initiate HTTP requests;
   a front-end server configured to serve HTTP responses in response to receiving HTTP requests from each of the clients;
   a secure networking device configured to pre-establish a secure connection to the front-end server, and to connect to the plurality of clients via a plurality of secure client-side connections, wherein the secure networking device is further configured to receive a plurality of HTTP requests from the plurality of clients via the plurality of secure client-side connections, and to route the requests from the plurality of clients to the front-end server over the secure front-end server-side connection; and
   a back-end server configured to process requests from the front-end server;
   wherein the secure networking device is configured to pre-establish a secure bank-end connection between the networking device and the back-end server, and to route traffic between the front-end server and back-end server, over the secure back-end connection, where the traffic is related to transactions requested by a plurality of originating clients.

36. A secure networking method for use in mediating communications between a plurality of clients and one or more servers via a secure networking device, the method comprising:
   pre-establishing a secure server-side connection between the secure networking device and a server;
   receiving requests at the secure networking device from the plurality of clients via plural client-side connections between the networking device and each of the clients;
   decrypting the client requests at the networking device;
   selecting an optimal server socket on the server for each request; and
   sending the requests from the plurality of clients over the pre-established secure server-side connection;
   wherein the step of selecting an optimal server socket is accomplished at least in part by determining a next server socket in a round robin.

37. The method of claim 36, wherein the server is one of a plurality of servers connected to the networking device via secure server-side connections, the method further comprising:
  selecting a target server for each request.

38. The method of claim 37, wherein the target server for each request is selected at least in part based on a characteristic of the request.

39. The method of claim 38, wherein the characteristic of the request is selected from a group consisting of content-type, content, and header.

40. The method of claim 36, further comprising:
  re-encrypting each request and forwarding it to the server over the pre-established server-side connection.

41. The method of claim 40, further comprising:
  receiving a response to each request from the server, via a pre-established secure server-side connection between the networking device and the server.

42. The method of claim 41, further comprising:
  decrypting each response, at the networking device.

43. The method of claim 41, further comprising:
  compressing each response, at the networking device.

44. The method of claim 41, further comprising:
  sending each response to an originating client, via a client-side secure connection.

45. A secure networking method for use in mediating communications between a plurality of clients and one or more servers via a secure networking device, the method comprising:
  pre-establishing a secure front-end server-side connection between the secure networking device and a front-end server;
  pre-establishing a secure back-end server connection between the networking device and a back-end server;
  receiving requests at the secure networking device from the plurality of clients via plural client-side connections between the networking device and each of the clients;
  decrypting the client requests at the networking device;
  re-encrypting each request and forwarding it to the front-end server over the re-established front-end server-side connection;
  sending the requests from the plurality of clients over the re-established secure front-end server-side connection;
  receiving a plurality of requests from the front-end server relating to transactions requested by a plurality of originating clients, via the secure front-end server connection; and
  sending the plurality of requests to the back-end server, via the pre-established, secure back-end server connection.

46. The method of claim 45, further comprising:
  receiving responses from the back-end server via the pre-established, secure back-end server connection; and
  sending each response to an originating front-end server, via the pre-established, secure front-end server connection.

47. The method of claim 46, wherein the back-end server is selected from the group consisting of an application server and a database server.

48. The method of claim 45, wherein the front-end server is a web server.

49. The method of claim 45, further comprising:
  periodically tearing down and reestablishing the secure server-side connection.

* * * * *

UNITED STATES PATENT AND TRADEMARK OFFICE
CERTIFICATE OF CORRECTION

| | | |
|---|---|---|
| PATENT NO. | : 7,055,028 B2 | Page 1 of 1 |
| APPLICATION NO. | : 10/136030 | |
| DATED | : May 30, 2006 | |
| INVENTOR(S) | : Christopher Peiffer and Israel L'Heureux | |

It is certified that error appears in the above-identified patent and that said Letters Patent is hereby corrected as shown below:

On the cover page, under "Related U.S. Application Data," section (60) should read --Provisional application No. 60/239,552, filed on Oct. 10, 2000, provisional application No. 60/287,188, filed on Apr. 27, 2001, provisional application No. 60/308,234, filed on Jul. 26, 2001.--

On Column 19, line 50, "font-end" should read --front-end--

On Column 22, line 6, "re-established" should read --pre-established--

On Column 22, line 9, "re-established" should read --pre-established--

Signed and Sealed this

Twenty-fifth Day of March, 2008

JON W. DUDAS
*Director of the United States Patent and Trademark Office*